United States Patent [19]

Cappel

[11] 4,011,749
[45] Mar. 15, 1977

[54] VIBRATION TESTING SYSTEM
[75] Inventor: Klaus L. Cappel, Madison, Ala.
[73] Assignee: Wyle Laboratories, El Segundo, Calif.
[22] Filed: Feb. 2, 1976
[21] Appl. No.: 654,114
[52] U.S. Cl. .............................................. 73/71.6
[51] Int. Cl.[2] ......................................... B06B 1/00
[58] Field of Search ................. 73/71.6, 71.5 R, 67

[56] References Cited
UNITED STATES PATENTS

| | | | |
|---|---|---|---|
| 2,890,584 | 6/1959 | Dickie ................................ | 73/71.6 |
| 3,699,807 | 10/1972 | Kerley, Jr. et al. ................. | 73/71.6 |

*Primary Examiner*—Richard C. Queisser
*Assistant Examiner*—John P. Beauchamp
*Attorney, Agent, or Firm*—Lindenberg, Freilich, Wasserman, Rosen & Fernandez

[57] ABSTRACT

A multi-degree-of-freedom shock and vibration testing system which includes a specimen-holding table having short projections engaged by hydraulic actuator assemblies. Each actuator assembly includes a pair of hydraulic actuators on opposite sides of the projection and a servo valve for connecting the actuators to a source of pressured hydraulic fluid and to a drain, to maintain the pair of actuators pressed firmly against opposite sides of the projection while moving substantially synchronously. A hydrostatic bearing pad bears against a rounded end of each actuator and against opposite sides of the projection, to permit the projection to slide perpendicular to the motion of the actuators and to pivot.

14 Claims, 10 Drawing Figures

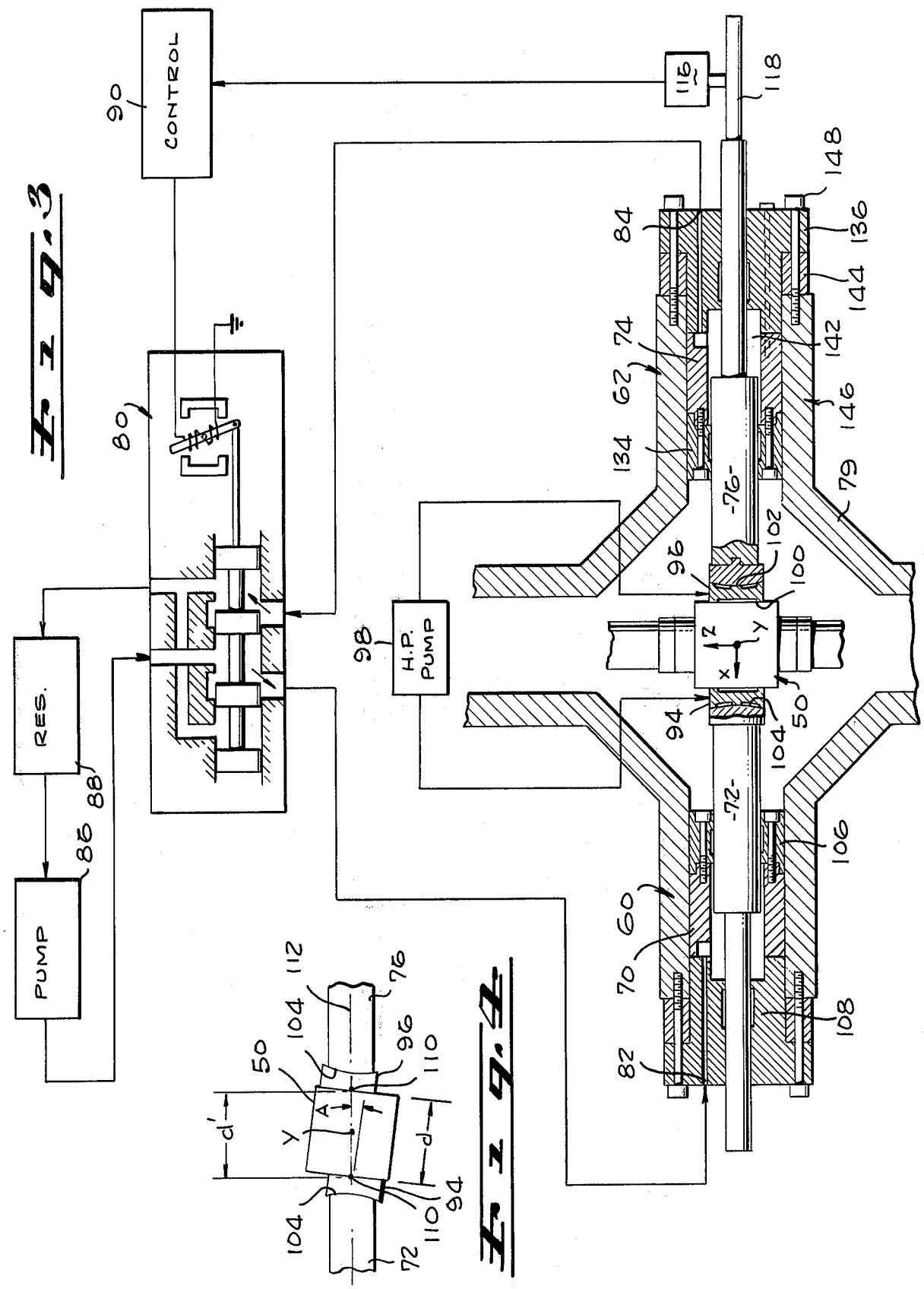

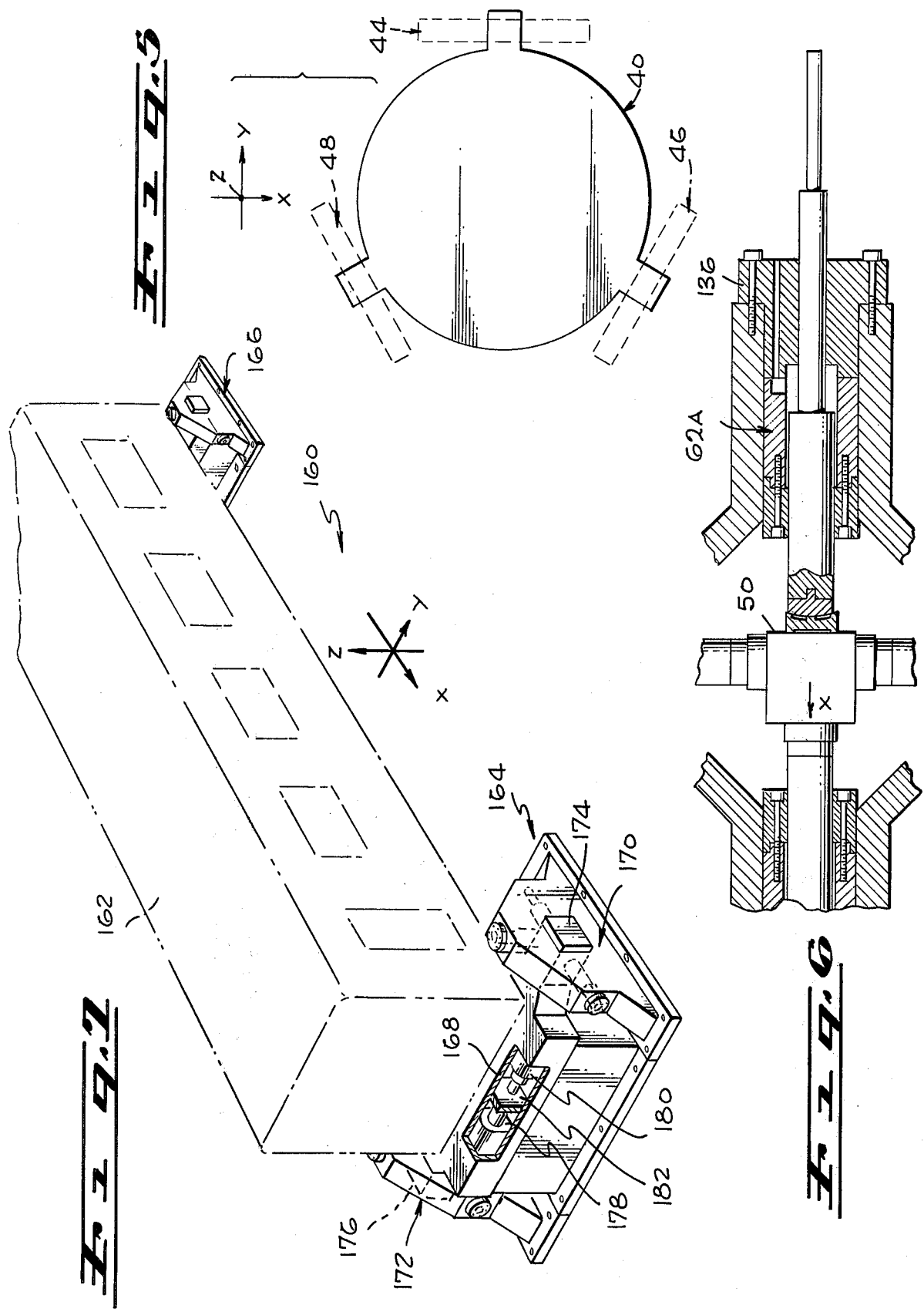

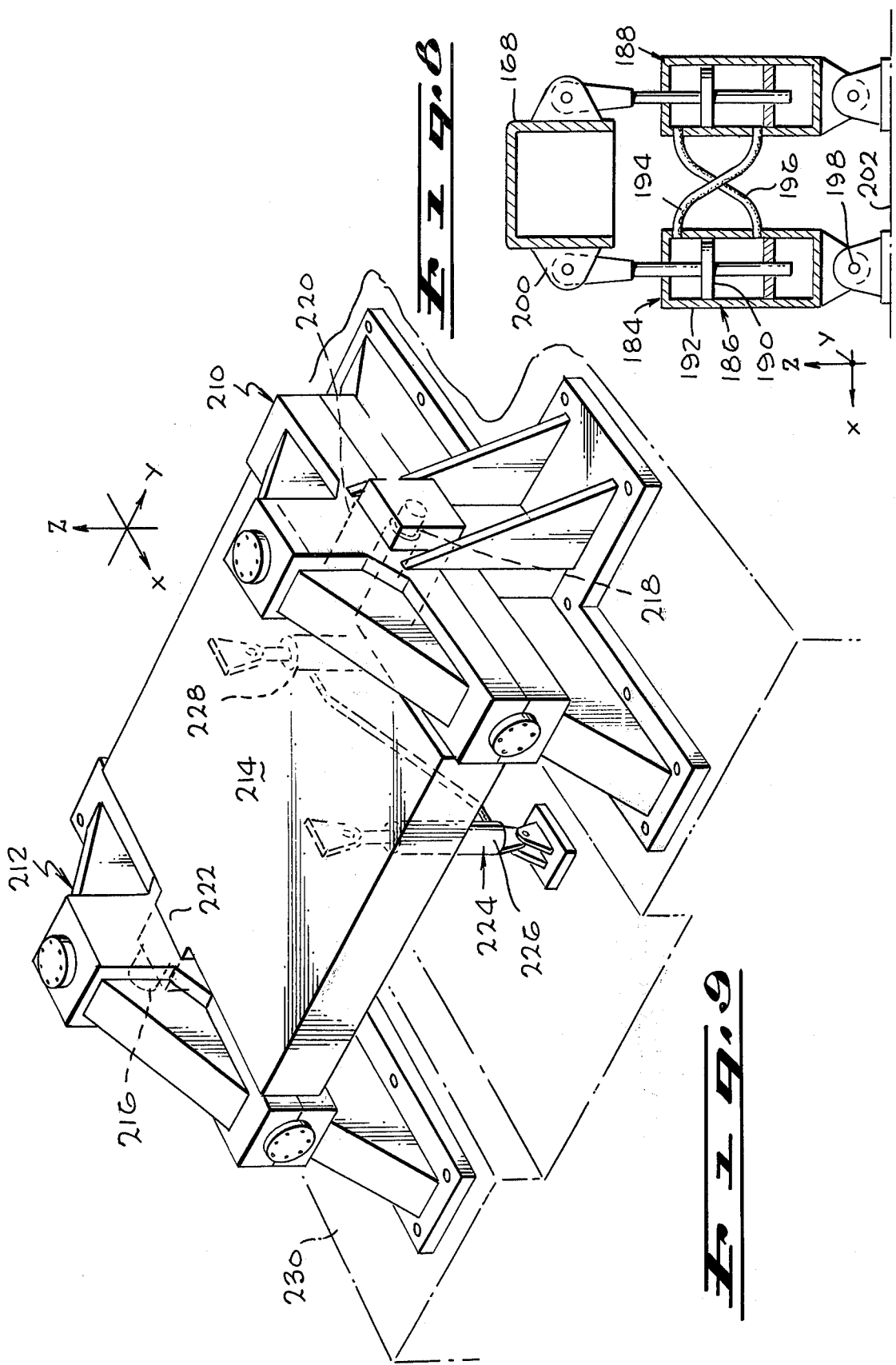

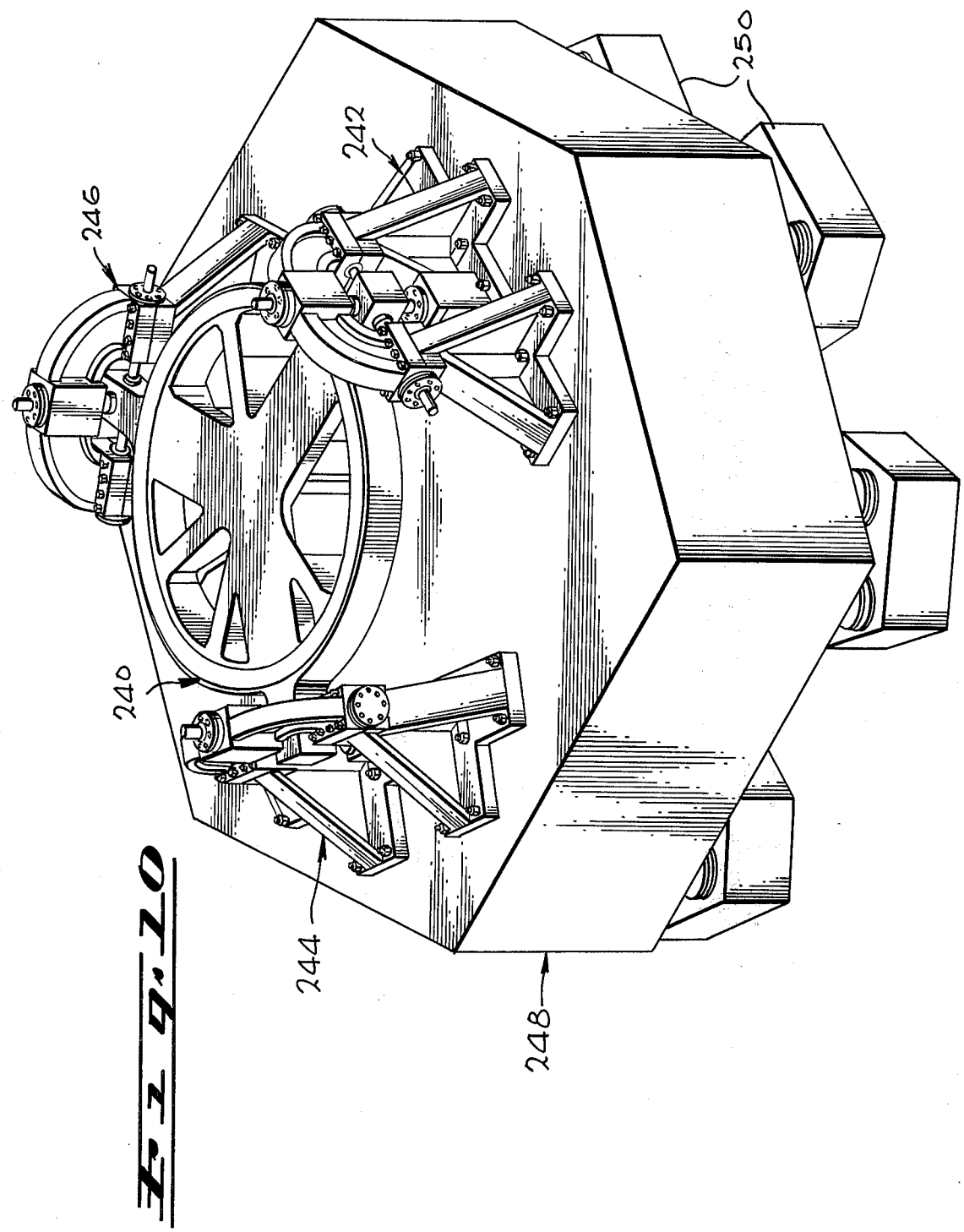

VIBRATION TESTING SYSTEM

BACKGROUND OF THE INVENTION

This invention relates to apparatus for vibrating or otherwise moving an article in limited displacement with multiple degrees of freedom.

Power plant equipment that may be subjected to seismic environments, space hardware, and a variety of other devices that may have to withstand shock or vibration, are often tested in an apparatus that produces dynamic loads simultaneously in several degrees of freedom, i.e., with motion along and/or rotation about, up to three perpendicular axes. Normally, such vibration is produced by hydraulic actuators which are attached at one end to a reaction mass and at another end to a table upon which the specimen-to-be-tested is mounted. The hydraulic actuators typically have cylinders and pistons respectively pivotally mounted to the reaction mass and table, to accommodate motion of the table perpendicular to the direction of movement of the piston of each hydraulic actuator. Such a mounting typically results in loading at the pivoting joints which can lead to fatigue failure, and results in lateral loads on the guide bearings of the piston rod as well as bending stresses on the piston itself. In addition, there is typically a long and sometimes narrow load path between the pressurized face of the piston and the table, which results in lower stiffness than desirable. Also, considerable space is required for the reaction masses on which the actuators are supported.

SUMMARY OF THE INVENTION

In accordance with one embodiment of the present invention, a multi-degree-of-freedom vibration testing system is provided which is compact, affords great stiffness between the actuator and specimen, virtually eliminates lateral loading of the actuators, and permits rapid change of the natural frequency of the system. The vibration system includes a table for holding a test specimen, projections extending from the table, and hydraulic actuator assemblies for moving the projections in predetermined directions while permitting free movement of the projections in other directions. Each hydraulic actuator assembly includes a pair of hydraulic actuators located on opposite sides of the projection that extends from the table, and a servo valve for selectively admitting hydraulic fluid into one actuator while allowing the exit of fluid from the other actuator, so that the actuators move substantially in synchronism, with each continuously pressing firmly against an opposite side of the projection. A hydrostatic bearing pad is located between the piston of each hydraulic actuator and the projection, to permit sliding of the projection in directions perpendicular to the actuators. Thus, where the pair of actuators extends horizontally to move the projection horizontally, the projection can still move vertically or in a horizontal direction that is perpendicular to the axes of the actuators. The actuators have pistons with spherical ends which engage spherical surfaces on the pads to permit pivoting of the pads, which allows the projection to also pivot. The natural frequency of each set of actuators can be readily changed by installing spacers that reduce the volume of the cylinder of each actuator.

The novel features of the invention are set forth with particularity in the appended claims. The invention will best be understood from the following description when read in conjunction with the accompanying drawings.

BRIEF DESCRIPTION OF THE DRAWINGS

FIG. 3 is a partial sectional view taken on the line 3—3 of FIG. 2;

FIG. 4 is a view of a portion of the apparatus of FIG. 3, shown during pivoting of a table projection thereof;

FIG. 5 is a plan view of the apparatus of FIG. 2;

FIG. 6 is a partial sectional view showing the apparatus of FIG. 3 in an altered configuration to increase the natural frequency thereof;

FIG. 7 is a partially sectional perspective view of a vibration testing system constructed in accordance with another embodiment of the invention;

FIG. 8 is a sectional side view of a stabilizing apparatus which is useful with the system of FIG. 7;

FIG. 9 is a partially sectional perspective view of a vibration testing system constructed in accordance with another embodiment of the invention; and FIG. 10 is a perspective view of another embodiment of the invention.

DESCRIPTION OF THE PREFERRED EMBODIMENTS

Figure 1:
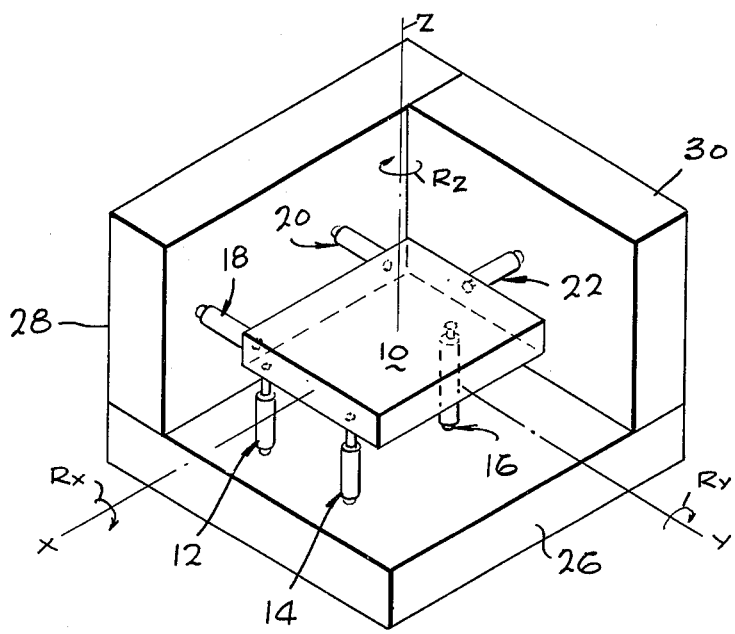
FIG. 1 is a perspective view of one example of a multi-degree-of-freedom vibration system of the Prior Art.

FIG. 1 illustrates a simple Prior Art six-degree-of-freedom vibration system for moving a table 10 along any of three axes X, Y, and Z, and for rotating the table about any of the axes as indicated by the arrows $R_x$, $R_y$, and $R_z$. The table is supported and moved along the Z axis by three actuators 12, 14, 16 arranged in a triangular pattern, is controlled in movement along the Y axis by two parallel actuators 18, 20, and controlled in movement along the X axis by an actuator 22. The six actuators also control pivoting about the three axes. Three reaction masses 26, 28, and 30 are required to provide anchor points for the six actuators. The large area occupied by the installation can be easily appreciated. My U.S. Pat. No. 3,295,224 shows an arrangement which allows all actuators to be mounted on the floor to provide a more compact installation, but with the efficiency of each actuator being greatly reduced by the fact that it does not act in line with the direction of intended table movement. The various vibration systems utilized for multi-degree-of-movement have typically employed elongated actuators that were liable to failures and impaired stiffness at the joints, and along the long pistons of the actuators.

Figure 2:
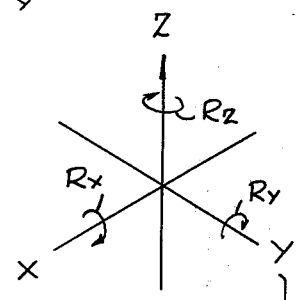
FIG. 2 is a perspective view of a vibration system constructed in accordance with one embodiment of the present invention, with a portion thereof shown in phantom lines.
Figure 2:
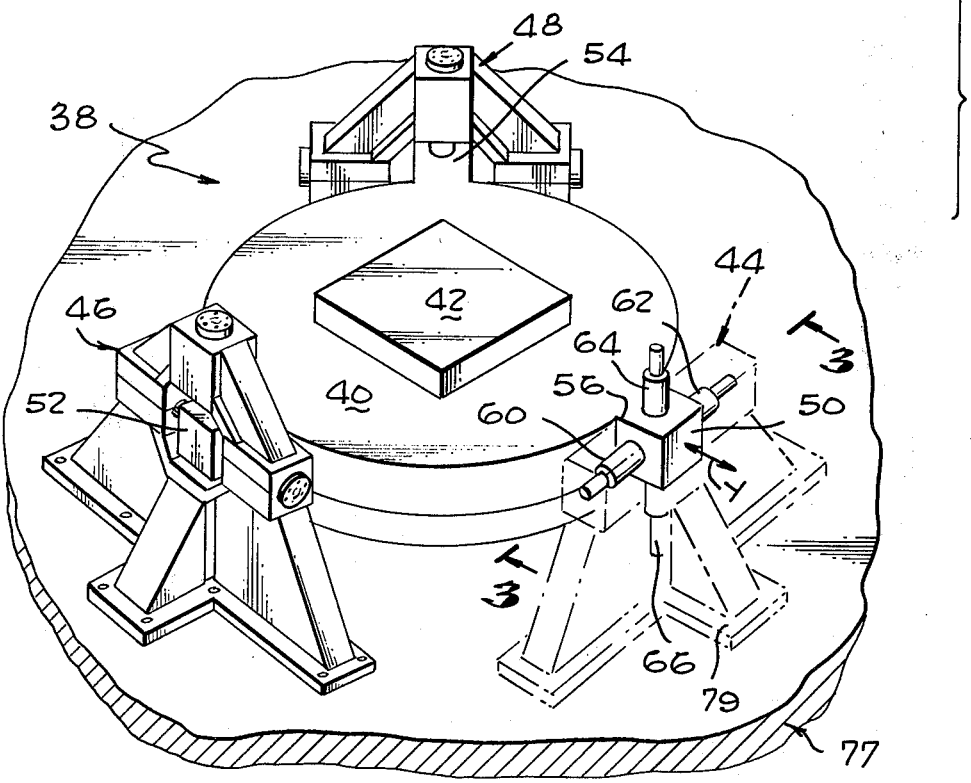

FIGS. 2 – 4 illustrate a vibration system 38 of the present invention, which utilizes a table 40 to support a specimen 42 that is to be tested for ruggedness under vibration and shock, and three hydraulic moving mechanisms, or actuator assemblies 44, 46, and 48, for moving the table. The table, which forms part of the load to be moved, has three load portions or projections 50, 52, 54 with inner ends 56 fixed to the table and outer ends 58 coupled to the actuator assemblies. Each hydraulic actuator assembly includes a pair of horizontal actuators 60, 62 and a pair of vertical actuators 64, 66, all mounted on a frame 79, for moving a corresponding projection horizontally and vertically. The arrangement of the three actuator assemblies enables the movement of the table 40 along the three axes, X, Y, and Z and in rotation about the three axes, within limited ranges of movement and rotation.

FIG. 3 illustrates details of the horizontal actuators 60, 62, which move the projection 50 laterally. The actuator 60 includes a cylinder part or cylinder 70 and a piston part or piston 72 which slides within the cylinder, the other actuator 62 also including a cylinder 74 and piston 76. The cylinder is supported on the reaction mass 77, which may be a concrete floor resting on the earth, through a frame 79 that is fixed to the reaction mass. A servo valve 80 is connected to ports 82, 84 of the two actuators to supply and receive hydraulic fluid to and from the cylinders. The servo valve in turn, is connected to a pump and accumulator assembly 86 which supplies pressured hydraulic fluid, and is connected to a reservoir 88 which receives hydraulic fluid from the servo valve. A control 90 is connected to the servo valve to operate it so as to control movement of the horizontal actuators. The servo valve 80 is a proportional control spool valve which meters the fluid along the return path, so that there is always an appreciable hydraulic pressure to cause both pistons to always press firmly against the projection 50. The hydraulic moving mechanism therefore forms a split actuator arrangement, with each actuator 60, 62 being free of fixed connection to the piston of the other actuator. However, the servo valve controls the entrance and escape of hydraulic fluid to the actuators so they always press firmly against a side of the load even while moving it.

A hydrostatic bearing or pad 94, 96 is positioned between the end of each piston 72, 76 and the projection 50. A high pressure pump 98 is connected to the two pads 94, 96 to supply hydraulic fluid under high pressure to the pads. The high pressured fluid is applied to both the outer face 100 of each pad that bears against the projection 50 and the inner face 102 of the pad which bears against the outer end 104 of a corresponding piston such as 72. The inner face 102 of each pad is concavely curved, while the end or face 104 of each piston is convexly curved to closely nest in the pad. The hydrostatic pads 94, 96 permit low friction sliding movement of the projection 50 with respect to the pads. Accordingly, the projection 50 is free to slide in the Z direction, in accordance with pressurization of the vertical actuators 64, 66, without imposing appreciable side forces on the bearings 106, 108 on which the horizontal pistons 72, 76 are slidably mounted on their respective cylinders. Also, the projection 50 can freely slide along the Y axis without imposing appreciable side loading on the bearings 106, 108.

The hydrostatic bearing pads 94, 96 not only permit sliding movement of the projection 50 along the Z and Y axes, but also permit free rotation of the projection 50 about the Y axis, within a limited range of movement. FIG. 4 illustrates the manner in which such rotation can occur. During rotation about the Y axis, each bearing pad 94, 96 tilts about the convex end 104 of its corresponding piston, while the opposite sides of the projection 50 slide with respect to the pads. During such pivoting, the distance between the two pistons 72, 76 increases slightly. This can be understood by considering the fact that for a projection 50 of width d, the distance between points 110 which lie on opposite sides of the projection and on the center line 112 of the two pistons 72, 76 increases to the distance $d'$. For a pivot angle A, the distance $d'$ equals $d/\cos A$. This increase in separation of the pistons 72, 76 is achieved because of the fact that the pistons are not rigidly connected to one another, but are pressed towards one another by fluid in their cylinders.

In order to provide feedback for the control 90 to sense the actual positions of the actuator pistons, a sensor 116 is provided which senses the position of a rod 118 that is fixed to an end of one piston 76.

As indicated in FIG. 5, movement of the table 40 along the X direction is accomplished by the horizontal actuators of all three actuator assemblies 44, 46, 48, movement along the Y direction is accomplished by horizontal actuators of two of the assemblies 46, 48, while movement in the vertical direction is accomplished by movement of the vertical actuator of all three actuator assemblies. The control circuit 90 is programmed to move each actuator in an amount required to achieve any desired table movement.

In vibration and shock testing apparatus, it is often desirable to raise the natural frequency of the vibration system. For example, it may be necessary to test the specimen at a higher frequency than the natural frequency of the hydraulic actuators, or it may be advantageous to provide a frequency for the system which is close to some resonant frequency of the specimen or to some frequency to which the specimen will be subjected in use. Normally, the hydraulic fluid is the most elastic load-carrying element, and therefore the natural frequency is raised by reducing the volume of hydraulic fluid in the cylinders. In prior art actuators, the reduction of cylinder volume has been accomplished by adding one or two spacers to the piston. However, this required complete disassembly of the hydraulic actuator, and there was a considerable possibility of causing damage to the seals or contamination of the hydraulic fluid by foreign matter. In the actuator assembly of FIG. 3, a change in cylinder volume can be accomplished without disassembly of the entire actuator. Each hydraulic actuator 60, 62 includes a pair of shoulder members 134, 136 that are slideably sealed to opposite end portions of the piston 72 or 76, and a cylinder member 140 that extends between the shoulder members and which traps hydraulic fluid in a volume 142 behind the front portion of the piston. A spacer 144 is located between one shoulder member 136 and the housing 146 of the actuator assembly. Bolts 148 extend through the shoulder member and spacer to hold the shoulder member in place.

The volume of hydraulic fluid behind each piston at its neutral position can be reduced by altering only one of the actuators such as 62. This is accomplished by removing the shoulder member 136 and spacer 144, and then reinstalling the shoulder member, but without the spacer 144, to the actuator configuration 62A shown in FIG. 6. The control system is adjusted to change the neutral position of the table projection 50, to a position at which the volume of fluid behind each actuator is the same. It may be noted that no part of the other actuator 60 need be changed. The change in volume of hydraulic fluid behind each piston in the neutral position of the table projection is thus accomplished rapidly.

The basic configuration of the split actuator which utilizes independent hydraulic actuators on opposite sides of a table projection, can be employed in a variety of multi-degree-of-freedom systems. FIG. 7 illustrates a test apparatus 160 for testing a long specimen such as a railroad car 162, which would be impractical to test realistically on a compact table. Instead, each end of the car is supported and vibrated by a separate actuator apparatus 164 or 166 which each include a table 168 moved along the longitudinal or X direction as well as along the vertical or Z direction by a pair of actuator assemblies 170, 172 that engage table projections 174, 176, all similar to the actuator assemblies of FIG. 2. In addition, a pair of transverse actuators 178, 180 are provided which move another table projection 182 transversely, or along the Y direction. The table 168 of each actuator apparatus is restrained in rotation about a transverse or Y axis by the body of the railcar test specimen 162, so that the railcar is able to flex freely in a vertical plane as it would under normal operating conditions.

Vibration and shock table systems are often checked out without a specimen, to ensure proper operation. However, the testing apparatus of FIG. 7 is unstable in the pitch rotational degree of freedom, or rotation about the Y axis, in the absence of the test specimen 162. FIG. 8 illustrates a test restraint apparatus 184 which restrains a table 168 against rotation about the Y axis, without interfering with motions in the other degrees of freedom. The restraint apparatus includes two hydraulic actuators 186, 188, each being double-ended and double-acting. Each actuator, such as 186, includes a piston 190 which lies in a cylinder 192, with the piston having equal areas on opposite sides of its center portion in which hydraulic fluid is held. The chambers of the actuators are pressurized and they are cross connected by hoses 194, 196 so that the upper chamber of one actuator is coupled to the lower chamber of the other. Thus, each hydraulic actuator can extend and retract without resistance during pure vertical motion of the table. The lower and upper ends of the two actuators are connected by universal joints 198, 200 to a reaction mass 202 and to the table 168, so that the two actuators permit rotation of the table about the vertical axis Z and longitudinal axis X. However, the table 168 cannot rotate about the Y axis because any such rotation would cause compression of fluid in two of the cross-connected chambers, so that any such pitching motion would be resisted. It may be noted that since the flow of hydraulic fluid between the actuators is not controlled by a servo valve, the piston areas of the actuators may be made as large as desired to provide the required stiffness and pitch, without greatly increasing the cost of the stabilizing apparatus.

FIG. 9 illustrates a two-degree-of-freedom shock and vibration system which utilizes two actuator assemblies 210, 212 to move a table 214 along the X and Z directions. Motion along the Y direction is restrained by a pair of transverse hydrostatic restraint bearings 216, 218 which press against convex ends of the table projections 220, 222. Except for the restraint bearings, the actuator assemblies 210, 212 are similar to those of FIG. 2. In order to prevent rotation about the Y direction, a pitch restraining assembly 224 is provided which is similar to the restraining assembly 184 of FIG. 8, the assembly 224 including two double-ended hydraulic actuators 226, 228 that are cross-connected to one another and which are pivotally mounted to the table and to a reaction mass 230. Rotation about the X and Z directions is controlled by the two actuator assemblies 210, 212, so that the apparatus of FIG. 10 can be operated to move the table 214 in only the X and Z directions.

FIG. 10 illustrates a vibration system largely similar to FIG. 2, but with FIG. 10 showing details of the table 240, the three actuator assemblies 242, 244, 246, and the reaction mass 248 and its supporting feet 250.

Thus, the invention provides a relatively simple actuator assembly for moving a specimen or specimen-holding table. This is accomplished by providing a pair of hydraulic actuators on opposite sides of the table projection or other element coupled to the table, with each hydraulic actuator being structurally independent from the other, but coupled by the same servo valve means to the hydraulic fluid supply and drain. In addition, each actuator is coupled to the table projection by a bearing such as a hydrostatic bearing, which permits sliding of the table projection with respect to the actuator and which permits rotation of the projection with respect to the actuator.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Apparatus for moving a load, comprising:
   a table having an actuator-movable portion with opposite sides; and
   hydraulic moving means for moving said table, including a pair of hydraulic actuators having bearing means bearing against the opposite sides of said actuator-movable table portion;
   each of said hydraulic actuators being constructed to move its bearing means parallel to an imaginary X axis; and
   each of said bearing means slideably bearing against a corresponding side of said table portion, to permit slideable movement of said table portion in a direction along an imaginary Z axis which is perpendicular to said imaginary X axis.

2. Apparatus for moving a load, comprising:
   a table having an actuator-movable portion with opposite sides; and
   hydraulic moving means for moving said table, including a pair of hydraulic actuators having bearing means bearing against opposite sides of said actuator-movable table portion;
   each of said bearing means comprising a hydrostatic bearing.

3. Apparatus for moving a load, comprising:
   a table having an actuator-movable portion with opposite sides; and
   hydraulic moving means for moving said table, including a pair of hydraulic actuators having bearing means bearing against opposite sides of said actuator-movable table portion;
   each of said actuators including a separate hydraulic cylinder and a separate piston movable in the corresponding cylinder and having an outer end, each of said bearing means comprises a pad having a first side pivotally coupled to said piston outer end and having a second side slideably coupled to a corresponding side of said table portion, whereby to allow slight shifting of relative positions of the pistons to allow pivoting of said table portion about an axis extending along its length.

4. Apparatus for moving a load, comprising:
   a table having an actuator-movable portion with opposite sides; and hydraulic moving means for moving said table, including a pair of hydraulic actuators having bearing means bearing against opposite sides of said actuator-movable table portion;

each of said actuators including a separate hydraulic cylinder member and a separate piston member slideable in the cylinder member, one of said members being supported with respect to the ground and the other having a convexly rounded end disposed against a bearing means;

each of said bearing means comprising a hydrostatic bearing having a concave first face mating with said convexly rounded end of an activator member, and having a second face bearing against said table portion, each of said faces forming a hydrostatic bearing.

5. Apparatus for moving a load, comprising:

a table having an actuator-movable portion with opposite sides; and hydraulic moving means for moving said table, including a pair of hydraulic actuators having bearing means bearing against opposite sides of said actuator-movable table portion;

each of said actuators including a cylinder with a forward end and an opposite rearward end, a piston slideable in said cylinder, forward sealing means positioned at said forward end of said cylinder for preventing the outflow of fluid thereat, and rearward sealing means positioned at said rearward end of said cylinder for preventing the outflow of fluid thereat; and means for holding said sealing means at different distances from one another, whereby to enable a change in the natural frequency of the actuator.

6. Apparatus for moving a load comprising:

a table having a specimen-supporting region and having three projections, each projection including an inner end connected to said specimen-holding portion of said table and an outer part;

three moving means for moving said table, each including a plurality of actuators bearing against locations spaced about the outer part of a corresponding one of said projections;

said projections all lying in substantially the same plane and being spaced from one another by approximately 120° about the center of said table.

7. An actuator system for moving a load, which has a load portion with opposite sides, with respect to a reaction mass, comprising:

first and second hydraulic actuators disposed on said opposite sides of said load portion, each actuator including a cylinder part and a piston part slideably mounted in the cylinder part, and with a first of said actuator parts supported on said reaction mass and the second actuator part bearing against a corresponding side of said load portion, each actuator having a hydraulic chamber for holding hydraulic fluid under pressure that presses said second actuator part towards said load portion; and means for selectively admitting pressured hydraulic fluid to the hydraulic chamber of one of said actuators while allowing the controlled escape of hydraulic fluid from the other actuator, to keep both actuators pressing firmly against opposite sides of said load portion while moving it;

said opposite sides of said load portion extending substantially vertically, and said load portion also having opposite top and bottom surfaces extending in substantially horizontal planes; and including third and fourth actuators respectively disposed against said top and bottom surfaces of said load portion;

each of said actuators having a hydrostatic bearing slideably disposed against said load portion, whereby to allow movement of said load portion by one pair of actuators without causing large sideward forces on the other pair of actuators.

8. An actuator system for moving a load, which has a load portion with opposite sides, with respect to a reaction mass, comprising:

first and second hydraulic actuators disposed on said opposite sides of said load portion, each actuator including a cylinder part and a piston part slideably mounted in the cylinder part, and with a first of said actuator parts supported on said reaction mass and the second actuator part bearing against a corresponding side of said load portion, each actuator having a hydraulic chamber for holding hydraulic fluid under pressure that presses said second actuator part towards said load portion; and means for selectively admitting pressured hydraulic fluid to the hydraulic chamber of one of said actuators while allowing the controlled escape of hydraulic fluid from the other actuator, to keep both actuators pressing firmly against opposite sides of said load portion while moving it;

at least one of said actuators including a cylinder with a forward end and an opposite rearward end, a piston slideable in said cylinder, forward sealing means positioned at said forward end of said cylinder for preventing the outflow of fluid thereat, rearward sealing means positioned at said rearward end of said cylinder for preventing the outflow of fluid thereat, and means for holding said sealing means at different distances from one another, whereby to enable a change in the natural frequency of the actuator.

9. An actuator system for moving a load, which has a load portion with opposite sides, with respect to a reaction mass, comprising:

first and second hydraulic actuators disposed on said opposite sides of said load portion, each actuator including a cylinder part and a piston part slideably mounted in the cylinder part, and with a first of said actuator parts supported on said reaction mass and the second actuator part bearing against a corresponding side of said load portion, each actuator having a hydraulic chamber for holding hydraulic fluid under pressure that presses said second actuator part towards said load portion; and means for selectively admitting pressured hydraulic fluid to the hydraulic chamber of one of said actuators while allowing the controlled escape of hydraulic fluid from the other actuator, to keep both actuators pressing firmly against opposite sides of said load portion while moving it;

each of said second actuator parts including a member with an inner portion exposed to hydraulic fluid in a chamber and an outer end which is convexly curved; and each of said second actuator parts also including a hydrostatic bearing pad having a concave inner face mating with said convexly curved outer end, and an outer face slideably disposed against said load portion.

10. Apparatus for moving a load, comprising:

a table having a central region, and having a plurality of projections spaced from said central region, each projection having a width less than half the width of said central table region;

a plurality of actuator assemblies, each coupled to a different one of said projections;

each actuator assembly including a plurality of actuators disposed about the corresponding projection and coupled thereto, each actuator constructed to exert force along a predetermined force axis, and the actuators of each assembly being oriented so that their force axes are spaced from the central region of the table so they do not pass therethrough.

11. The apparatus described in claim 10 wherein:

said plurality of projections comprises three projections spaced 120° apart about the center of said table.

12. The apparatus described in claim 10 wherein:

each of said actuators has a bearing end which is slideably disposed against a corresponding projection to enable relative sliding in a direction perpendicular to the force axis of the actuator.

13. The apparatus described in claim 10 wherein:

each of said actuator assemblies comprises a hydraulic cylinder member, and a hydraulic piston member slideably disposed in the cylinder member; and including means defining a reaction mass, one of said hydraulic members of each actuator connected to said reaction mass and the other connected to one of said projections.

14. Testing apparatus, comprising:

a largely horizontal table having a pair of opposite sides and a pair of opposite ends;

a pair of hydraulic moving means connected to said opposite sides for moving said table longitudinally and vertically while leaving said table free to pitch about a laterally-extending axis; and a pair of pitch-preventing double-acting hydraulic actuators pivotally connected to longitudinally spaced locations on said table, each actuator including upper and lower hydraulic chambers and a piston disposed between and separating said chambers; and means for coupling the upper hydraulic chamber of each actuator to the lower chamber of the other actuator, whereby to prevent pitching of the table.

* * * * *